United States Patent [19]

Comparetto

[11] Patent Number: 4,464,026
[45] Date of Patent: Aug. 7, 1984

[54] PERIPHERAL FIBEROPTIC CONTACT LENS

[76] Inventor: John E. Comparetto, 108 Cropper St., Chincoteague, Va. 23336

[21] Appl. No.: 60,065

[22] Filed: Jul. 24, 1979

[51] Int. Cl.³ .......................... G02B 5/14; G02C 7/04
[52] U.S. Cl. ............................. 351/160 R; 350/96.15; 350/96.24
[58] Field of Search .................. 350/198, 96.23, 96.24, 350/96.18, 96.19, 441, 96.15; 351/160 R-162, 16, 219

[56] References Cited
PUBLICATIONS

Zoethout, W. D.; *Physiological Optics*; Professional Press; Chicago (1927); pp. 147 and 148.

*Primary Examiner*—John K. Corbin
*Assistant Examiner*—Scott J. Sugarman

[57] ABSTRACT

A contact lens for the human eye have radially embedded optic fibers within the body of the lens. The fibers direct incoming light to the retina to increase the amount of stimulated retina surface available to the wearer.

8 Claims, 8 Drawing Figures

PERIPHERAL FIBEROPTIC CONTACT LENS

BACKGROUND OF THE INVENTION

The improvement of peripheral vision has always been a desirable thing in sports, aviation, and in just daily living. Man has been hampered by the boundaries of his own anatomy, for example, deep set eyes with heavy bone structure often have less peripheral vision than people with eyes that are less deep set. Offspring of a parent with deep set eyes and a parent of shallow set eyes may have a child with the retinal capacity of the parent with the shallow set eyes but with the bone structure of the parent with the deep set eyes. Since the stimulation of the retina depends upon the amount of light passing through the lens of the eye, it is the specific object of this invention to bring light images from periphery to the retina, thus increasing the overall amount of retinal tissue that can be possible stimulated. In the case of the infant with the deep set eye structure but with the retinal capacity of the shallow set eye parent, it is assumed from current opthalmologic knowledge that this retinal tissue would be viable if it were stimulated by images as the eye and brain develop. However, it is not yet known until a definitive model of this invention is built how the adult with possibly dormant retinal tissue will handle this new optical information that is being added to the individual's present visual field. It is hoped that the brain will be able to tolerate and assimilate this added information in a usefully integrated manner.

OJBECTS OF THE INVENTION

An object of the invention is to increase peripheral vision.

Another object of the invention is to increase to the maximum, the amount of retinal tissue stimulated.

A final object of the invention is to increase the amount of visual perception in an individual.

DETAILED DESCRIPTION OF THE INVENTION

Figure 1:
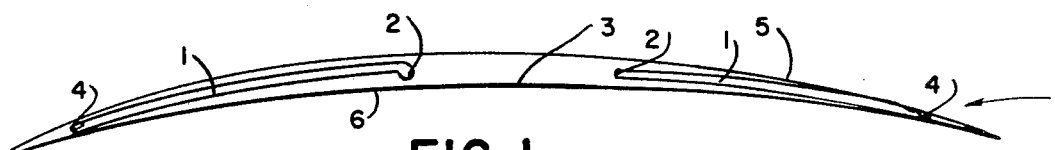
FIG. 1 is a cross-sectional view of the lens.

FIG. 1 shows optic fibers 1 within contact lens. Section 2 is the lens-ward or retina-ward end of the fiberoptic whereas 4 is the periphery oriented end of the fiberoptic. The arrows show the direction of orientation of 4 against the direction of the incoming light. Section 3 is the central lens portion of having a prescription of the wearer if one is needed. Section 5 is the outer lens surface making a smooth contact with the eye lids. Section 6 is the inner surface allowing a smooth contact with the eye structure.

Figure 2:
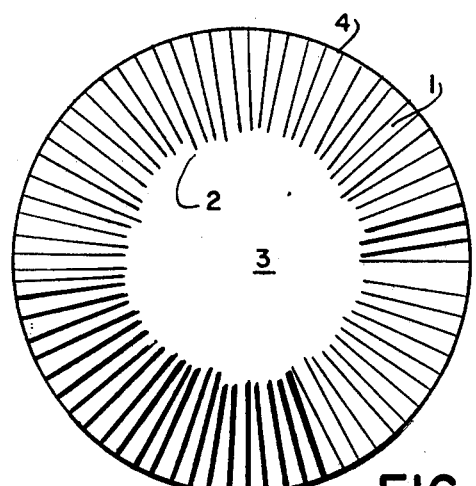
FIG. 2 is a broad view or frontal view of the lens.
Figure 5A:
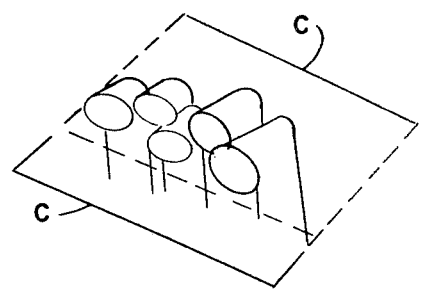
FIG. 5A and 5B show the inner arrangement of the fiberoptic fibers.
Figure 5B:
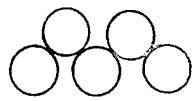

FIG. 2 is a frontal view of FIG. 1 showing the radial arrangement of fiberoptics. The radial placement of the fibers is necessary since contact lenses generally spin on the lacrimal fluid of the eye and therefore this radial arrangement guarantees that there is always ample fiberoptic exposure to the lateral images. In the instance where lenses do not spin, the fiberoptic need only be on the lateral side of each lens. It is desirable that the fiberoptics be wider at end 4 than at end 2 to insure that there are no gaps in light input due to spoking apart of the optic strands. If the fibers can not be fabricated with variances in diameter in the same fiber, then the fibers can be arranged as seen in FIGS. 5A and 5B. FIG. 5A shows the Section 2 end of the fiberoptic showing an overlapping of strands at this central portion that allows for geometric widening as they move towards the periphery. FIG. 5B shows a cross-section through the fiberoptic at level C of FIG. 5A. The fiberoptics must be kept at a thinness that will keep the contact lens from being too thick.

Figure 3:
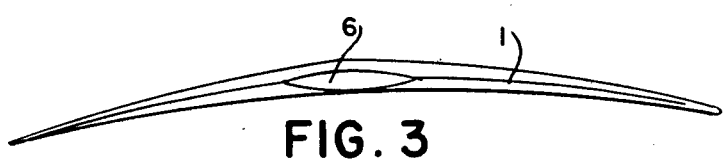
FIG. 3 is a cross-section of an optional lens system.

FIG. 3 shows a thickened version of a contact lens where Section 6 illustrates a separate lens with the patient's prescription imbedded within the the contact lens. The imbedded lens receives the peripheral light in the same manner as the previously described lens.

Figure 4A:
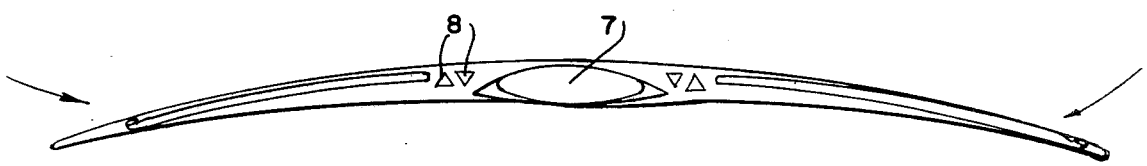
FIG. 4A is another cross-section of yet another optional lens system.
Figure 4B:
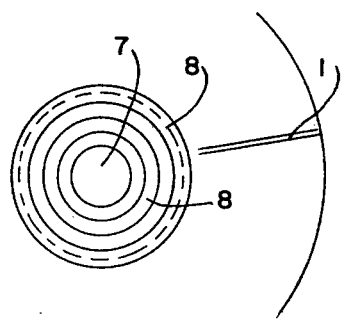
FIG. 4B is a perspective view of system 4A.

FIG. 4A shows a lens system similar to described in FIG. 3 but with circular oriented prisms 8 for focusing the fiber input on lens 7. FIG. 4B shows the frontal view of the circularly oriented prisms.

Figure 6:
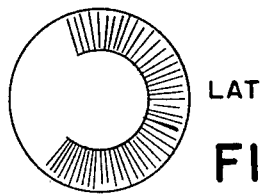
FIG. 6 shows a contact lens with lateral peripheral fiberoptics.

FIG. 6 depicts the type of contact lens that because of its larger size does not spin on the surface of the eye but stays basically in a stable position. The need for fiberoptics in this instance would only be on the lateral side of each lens.

What is claimed:

1. A contact lens having at its periphery optical fibers capable of bringing peripheral light images to the central portion of the contact lens.

2. The fiberoptic lens of claim 1 that has orientation of the fiberoptic ends to the central portion at the central end of the fiber and in a lateral direction at the peripheral end of the fiber.

3. The contact lens of claim 1 wherein the fiberoptics having narrower diameter centrally and a wider diameter peripherally to accommodate the fanning-spoking affect of the radial arrangement so that there is no gapping in incoming light.

4. The contact lens of claim 1 wherein the centrally oriented end of the fiberoptic are arranged in overlapping fashion so that they may accommodate the peripheral spoking of fiberoptics so that there are no gaps in light transmission from the periphery.

5. A contact lens having an internal central lens containing the prescription of the wearer imbedded within a larger contact lens enclosing radially oriented fiberoptic.

6. The contact lens of claim 5 that allows for the radially oriented arrangement of fiberoptics from the central lens to the periphery of the outer imbedding lens.

7. A contact lens having a centrally imbedded lens with the prescription of the wearer, having at the periphery of such a central lens a circularly oriented prism system to accommodate light from the central end of the radially arranged fiberoptics.

8. A contact lens having a fan shaped radial arrangement of fiberoptics to accommodate the lateral areas of vision.

* * * * *